(12) United States Patent
Nishikoori

(10) Patent No.: US 12,325,078 B2
(45) Date of Patent: Jun. 10, 2025

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Hironori Nishikoori, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 314 days.

(21) Appl. No.: 17/913,434

(22) PCT Filed: Mar. 24, 2021

(86) PCT No.: PCT/JP2021/012220
§ 371 (c)(1),
(2) Date: Sep. 22, 2022

(87) PCT Pub. No.: WO2021/193709
PCT Pub. Date: Sep. 30, 2021

(65) Prior Publication Data
US 2023/0132425 A1    May 4, 2023

(30) Foreign Application Priority Data

Mar. 25, 2020  (JP) ................. 2020-054422

(51) Int. Cl.
*B23C 5/20* (2006.01)
*B23C 5/02* (2006.01)
*B23C 5/10* (2006.01)

(52) U.S. Cl.
CPC .............. *B23C 5/109* (2013.01); *B23C 5/202* (2013.01); *B23C 2200/0411* (2013.01); *B23C 2200/28* (2013.01)

(58) Field of Classification Search
CPC .............. B23C 5/109; B23C 2200/202; B23C 2200/0411; B23C 2200/028;
(Continued)

(56) References Cited

U.S. PATENT DOCUMENTS

2004/0208714 A1   10/2004  Stabel et al.
2013/0115022 A1   5/2013   Ishi

FOREIGN PATENT DOCUMENTS

JP    2004314301 A    11/2004
JP    201240636 A     3/2012
(Continued)

*Primary Examiner* — Sara Addisu
(74) *Attorney, Agent, or Firm* — HAUPTMAN HAM, LLP

(57) ABSTRACT

A cutting insert has an upper surface having a long side, a short side, a lower surface, a lateral surface and a through hole. The lateral surface has a first lateral surface. The first lateral surface has a first plane that is overlapped with a central axis of the through hole in a front view and is parallel to the central axis, a second plane that is located closer to the short side than the first plane and is parallel to the central axis, a third plane that is located more away from the short side than the first plane and is parallel to the central axis, and a first inclined surface that is located between the second plane and the upper surface and comes closer to the central axis as coming closer to the long side. The first inclined surface is located away from the first plane.

20 Claims, 16 Drawing Sheets

(58) Field of Classification Search
CPC ...... B23C 2200/125; B23C 2200/2849; B23C 2200/284; B23C 2200/203; B23C 2200/083; B23C 2200/369
See application file for complete search history.

(56) References Cited

FOREIGN PATENT DOCUMENTS

| | | | | |
|---|---|---|---|---|
| WO | WO-03101654 A1 | * | 12/2003 | ............. B23C 5/109 |
| WO | 2012020784 A1 | | 2/2012 | |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/012220 filed on Mar. 24, 2021, which claims priority to Japanese Application No. 2020-054422 filed on Mar. 25, 2020. The contents of the Japanese application are incorporated herein by reference in its entirety.

TECHNICAL FIELD

The present disclosure generally relates to a cutting insert, a cutting tool and a method for manufacturing machined product, which are used in a cutting process of a workpiece. More specifically, the present disclosure relates to a cutting tool for use in a milling process.

BACKGROUND

For example, a cutting insert discussed in Japanese Unexamined Patent Publication No. 2004-314301 (Patent Document 1) has been known as a cutting insert for use in a cutting process of a workpiece, such as metal. The cutting insert discussed in Patent Document 1 has a quadrangular plate shape. The cutting insert discussed in Patent Document 1 has a cutting edge located on an intersection of an upper surface and a lateral surface, and a fixing hole that opens into the upper surface and a lower surface.

In recent years, there is a demand for downsizing of cutting inserts. However, the downsizing of the cutting inserts may lead to a tendency of a small thickness between a through hole (fixing hole) and the lateral surface, and may cause deterioration in durability. Hence, there is a demand for improved durability of the cutting inserts.

SUMMARY

A cutting insert in a non-limiting aspect of the present disclosure has an upper surface, a lower surface, a lateral surface, a through hole and a cutting edge. The upper surface having a polygonal shape has a long side and a short side. The lower surface is located on a side opposite to the upper surface. The lateral surface is located between the upper surface and the lower surface. The through hole opens into a center of the upper surface and a center of the lower surface. The cutting edge is located on the short side. The lateral surface has a first lateral surface that is located along the long side and has an outwardly protruded shape in a top view. The first lateral surface has a first plane, a second plane, a third plane and a first inclined surface. The first plane is overlapped with a central axis of the through hole in a front view, and is parallel to the central axis. The second plane is located closer to the short side than the first plane, and is parallel to the central axis. The third plane is located more away from the short side than the first plane, and is parallel to the central axis. The first inclined surface is located between the second plane and the upper surface, and comes closer to the central axis as coming closer to the long side. The first inclined surface is located away from the first plane.

EMBODIMENTS

<Cutting Inserts>

Figure 1:
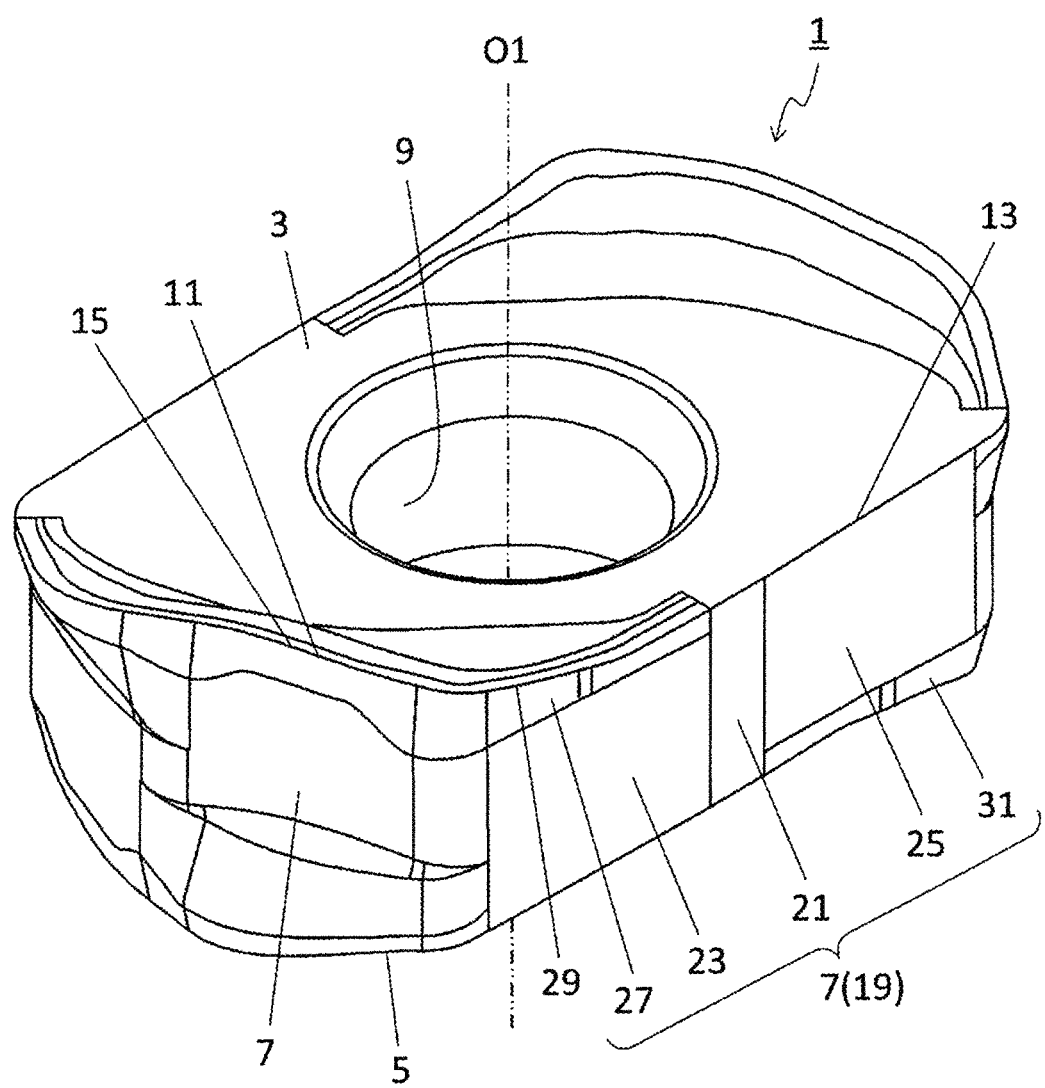
FIG. 1 is a perspective view illustrating a cutting insert in a non-limiting embodiment of the present disclosure.

The cutting insert 1 (hereinafter also referred to as "insert 1") in a non-limiting embodiment of the present disclosure is described in detail below with reference to the drawings. For the convenience of description, the drawings referred to in the following illustrate, in simplified form, only main members necessary for describing the non-limiting embodiment. The insert 1 may therefore include any arbitrary structural member not illustrated in the drawings referred to. Dimensions of the members in each of the drawings faithfully represent neither dimensions of actual structural members nor dimensional ratios of these members.

The insert 1 may have an upper surface 3, a lower surface 5, a lateral surface 7, a through hole 9, and a cutting edge 11 as in a non-limiting embodiment illustrated in FIGS. 1 to 9. As used herein, the terms "the upper surface 3" and "the lower surface 5" are used for the sake of convenience, but do not indicate upper and lower directions. For example, the upper surface 3 need not be directed upward when using the insert 1.

The upper surface 3 may have a polygonal shape as in the non-limiting embodiment illustrated in FIG. 1. For example, the upper surface 3 may have a hexagonal shape. The lower surface 5 may be located on a side opposite to the upper surface 3. Similarly to the upper surface 3, the lower surface 5 may have a polygonal shape, for example, a hexagonal shape. The insert 1 may have a polygonal plate shape.

The polygonal shape may be an approximately polygonal shape, but need not be a strict polygonal shape. For example, a plurality of sides in the upper surface 3 need not be individually a strict straight line, but may be curved in a front view (top view) of the upper surface 3. A plurality of corners in the upper surface 3 need not be individually a strict corner.

The plurality of sides in the upper surface 3 may have a long side 13 and a short side 15. That is, the upper surface 3 may have the long side 13 and the short side 15. Similarly to the upper surface 3, the lower surface 5 may also have a long side and a short side. In cases where the plurality of sides in the upper surface 3 have two sides different in length, a relatively long side of these two sides may be the long side 13, and a relatively short side may be the short side 15.

Figure 2:
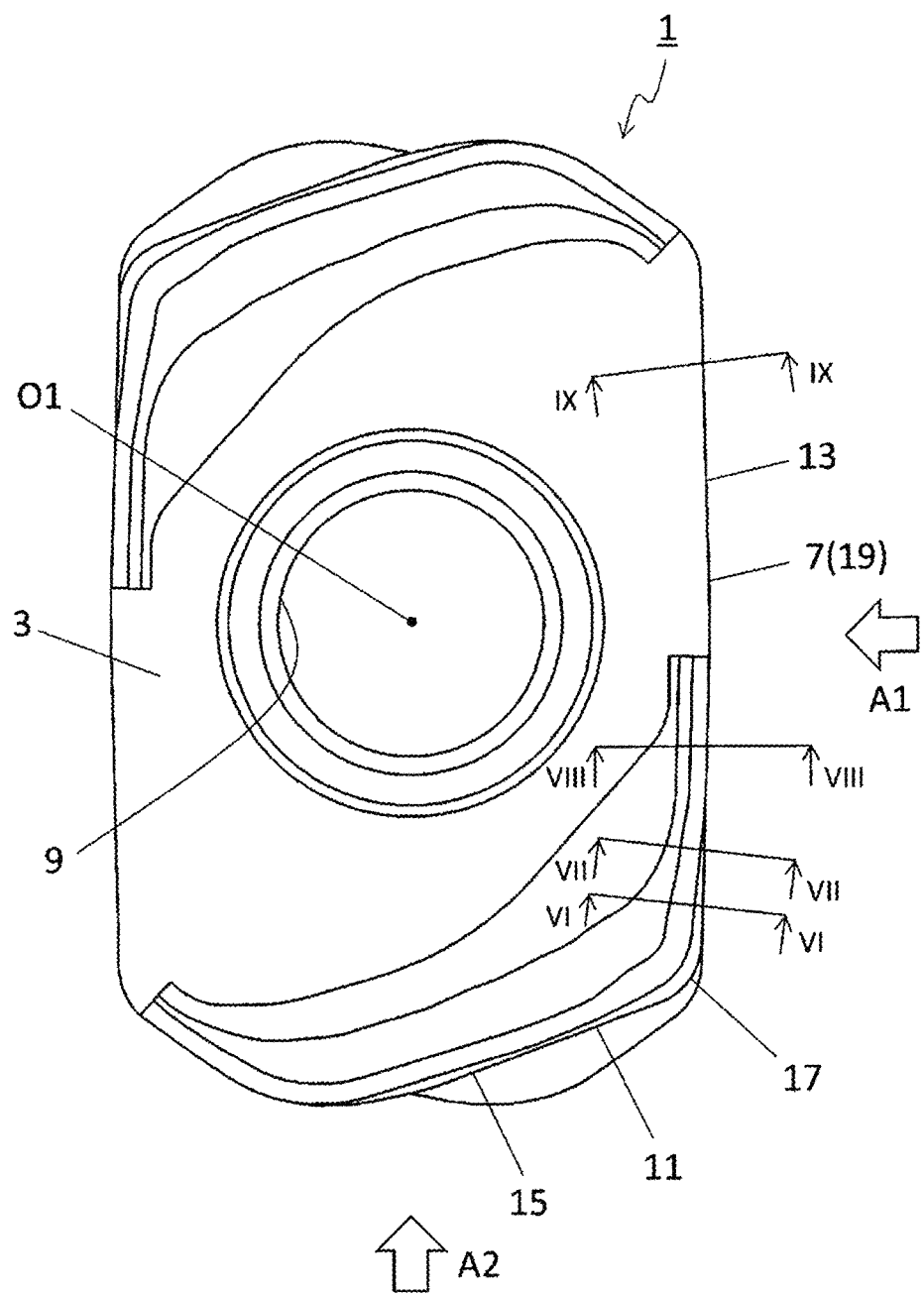
FIG. 2 is a plan view of the cutting insert illustrated in FIG. 1 as viewed from above.
Figure 3:
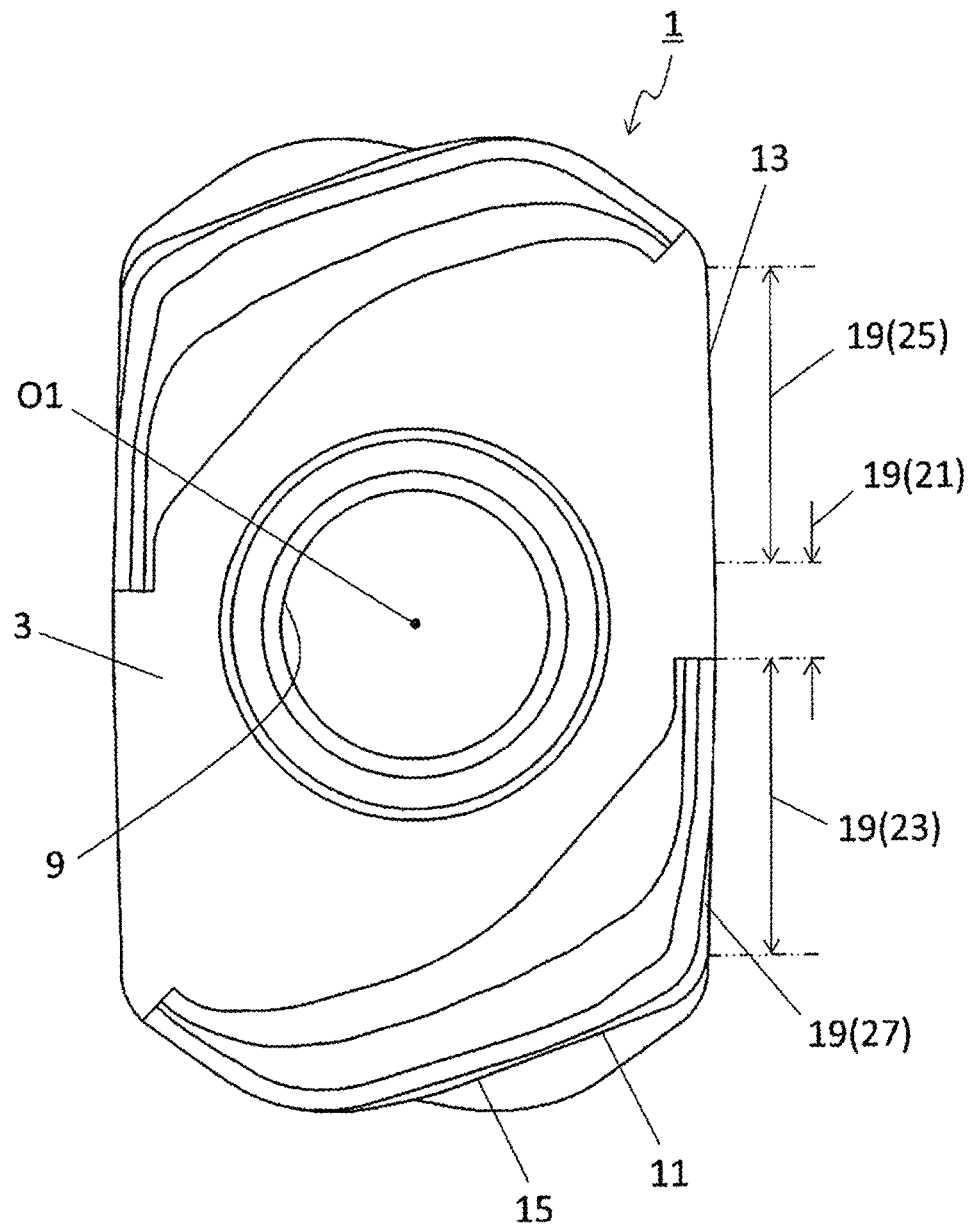
FIG. 3 is a plan view of the cutting insert illustrated in FIG. 1 as viewed from above.

A corner 17 located between the long side 13 and the short side 15 may have an obtuse angle as in the non-limiting embodiment illustrated in FIG. 2. The corner 17 is less likely to be fractured in this embodiment. The corner 17 is not limited to a strict corner formed by an intersection of the long side 13 and the short side 15. For example, the corner 17 may have a convex curvilinear shape or a combined shape made up of a straight line and a curved line in a top view.

The lateral surface 7 may be located between the upper surface 3 and the lower surface 5. The lateral surface 7 may connect to the upper surface 3 and the lower surface 5 as in a non-limiting embodiment illustrated in FIG. 4.

The through hole 9 is usable for inserting, for example, a screw when fixing the insert 1 to a holder. Instead of the screw, for example, a clamping member may be used to fix the insert 1 to the holder.

The through hole 9 may open into a center of the upper surface 3 and a center of the lower surface 5. If the upper surface 3 has a polygonal shape, corners located at opposite angles on the upper surface 3 may be individually connected by a straight line, and a point of intersection of these straight lines may be regarded as the center of the upper surface 3. Similarly, if the lower surface 5 has a polygonal shape, corners located at opposite angles on the lower surface 5 may be individually connected by a straight line, and a point of intersection of these straight lines may be regarded as the center of the lower surface 5. A starting point of a diagonal may be a portion where extension lines of individual sides constituting the polygonal shape intersect with each other. If the lower surface 5 does not have the polygonal shape, the center of the lower surface 5 may be determined by, for example, a position of a center of gravity of the lower surface 5 in a front view (bottom view) of the lower surface 5.

A central axis O1 of the through hole 9 may be an imaginary straight line passing through a center of the upper surface 3 and a center of the lower surface 5. A central axis of the insert 1 may also be the imaginary straight line passing through the center of the upper surface 3 and the center of the lower surface 5. In other words, the central axis O1 of the through hole 9 may coincide with the central axis of the insert 1.

The upper surface 3 may have 180° rotational symmetry around the central axis O1 in a top view. The lower surface 5 may have 180° rotational symmetry around the central axis O1 in a bottom view.

The insert 1 is not limited to a specific size. For example, a maximum width in a top view of the upper surface 3 may be set to approximately 6-25 mm. A height from the upper surface 3 to the lower surface 5 may be set to approximately 1-10 mm. The height from the upper surface 3 to the lower surface 5 may denote a maximum value of a distance between the upper surface 3 and the lower surface 5 in a direction parallel to the central axis O1. The height from the upper surface 3 to the lower surface 5 may be rephrased as a width of the lateral surface 7 in a direction along the central axis O1.

The cutting edge 11 may be located on the short side 15. The cutting edge 11 is usable for cutting out a workpiece if a machined product is manufactured using the insert 1.

If the cutting edge 11 is located on the short side 15, one of the upper surface 3 and the lateral surface 7 may have a rake surface region, and one of the upper surface 3 and the lateral surface 7 may have a flank surface region. The upper surface 3 may have the rake surface region, and the lateral surface 7 may have the flank surface region as in the non-limiting embodiment illustrated in FIG. 1.

The insert 1 may further have another cutting edge located on a side of the lower surface 5 in addition to the cutting edge 11. For example, the lower surface 5 may have a short side located below the short side 15, and the insert 1 may have another cutting edge located on the short side of the lower surface 5. This makes it possible to obtain the insert 1 of double-sided type.

The lateral surface 7 may have a first lateral surface 19. The first lateral surface 19 may be located along the long side 13. The first lateral surface 19 may have an outwardly protruded shape in a top view as in the non-limiting embodiment illustrated in FIG. 2.

The first lateral surface 19 may have a first plane 21, a second plane 23, a third plane 25 and a first inclined surface 27.

The first plane 21, the second plane 23 and the third plane 25 may be used as a surface that comes into touch (contact) with a holder when fixing the insert 1 to the holder. The first plane 21 may be overlapped with the central axis O1 in a front view (side view) as in a non-limiting embodiment illustrated in FIG. 4. The first plane 21 may be parallel to the central axis O1. The second plane 23 may be located closer to the short side 15 than the first plane 21. The second plane 23 may be parallel to the central axis O1. The third plane 25 may be located more away from the short side 15 than the first plane 21. The third plane 25 may be parallel to the central axis O1. The term "parallel" is not limited to a strict parallel, but may denote that an inclination of approximately ±5° is allowed.

The first plane 21, the second plane 23 and the third plane 25 may be individually a flat surface. However, the first plane 21, the second plane 23 and the third plane 25 need not be a strict flat surface. The first plane 21, the second plane 23 and the third plane 25 may be an approximately flat surface, and specifically may be slightly curved or may have small irregularities to such a degree that cannot be seen if the insert 1 is viewed as a whole. For example, the first plane 21, the second plane 23 and the third plane 25 may have small irregularities of approximately several tens of μm.

The first inclined surface 27 may be located between the second plane 23 and the upper surface 3. The first inclined surface 27 may come closer to the central axis O1 as coming closer to the long side 13 as in a non-limiting embodiment illustrated in FIG. 6. A positional relationship with the central axis O1 may be evaluated on the basis of an imaginary straight line O1a parallel to the central axis O1.

Figure 4:
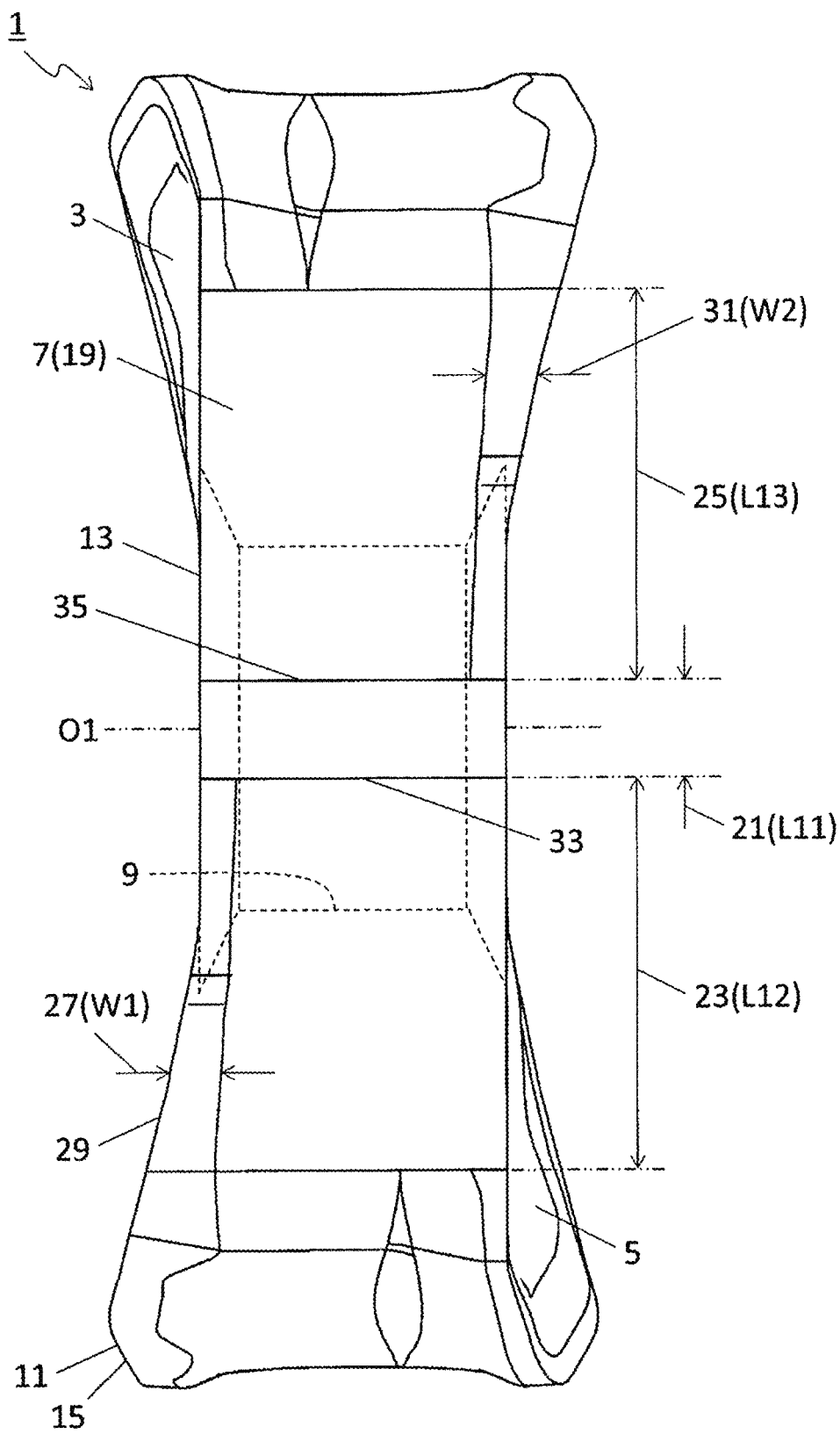
FIG. 4 is a side view of the cutting insert illustrated in FIG. 2 as viewed from an A1 direction.
Figure 5:
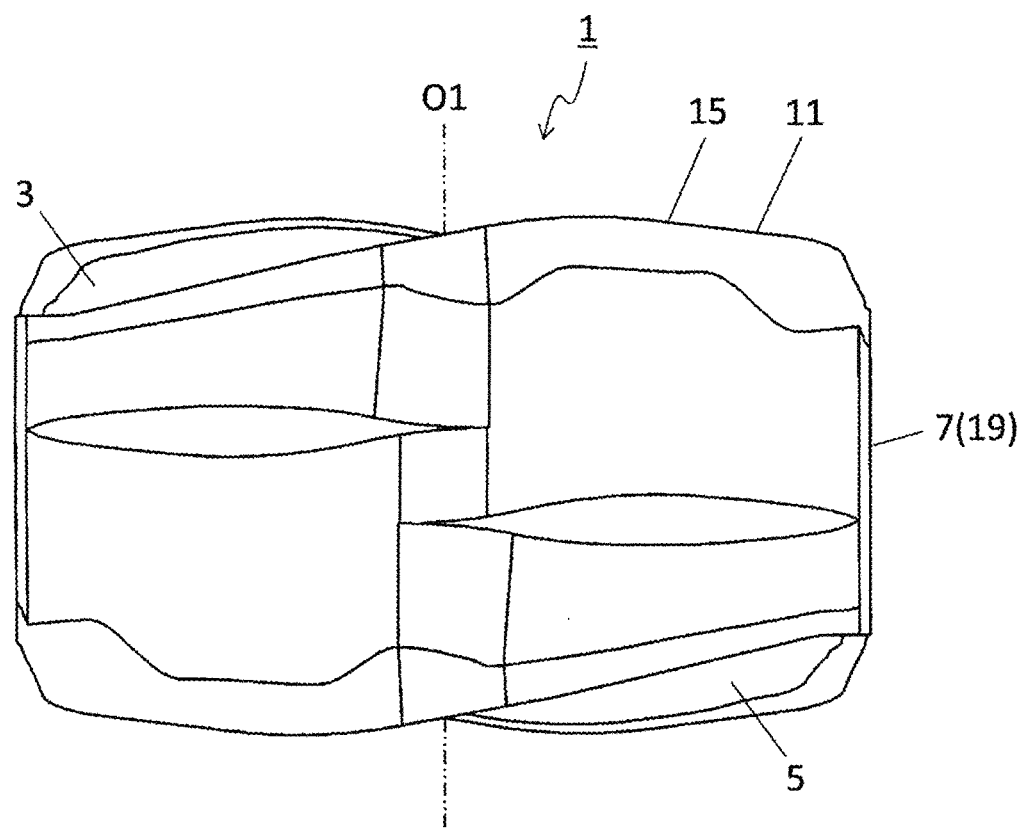
FIG. 5 is a side view of the cutting insert illustrated in FIG. 2 as viewed from an A2 direction.
Figure 6:
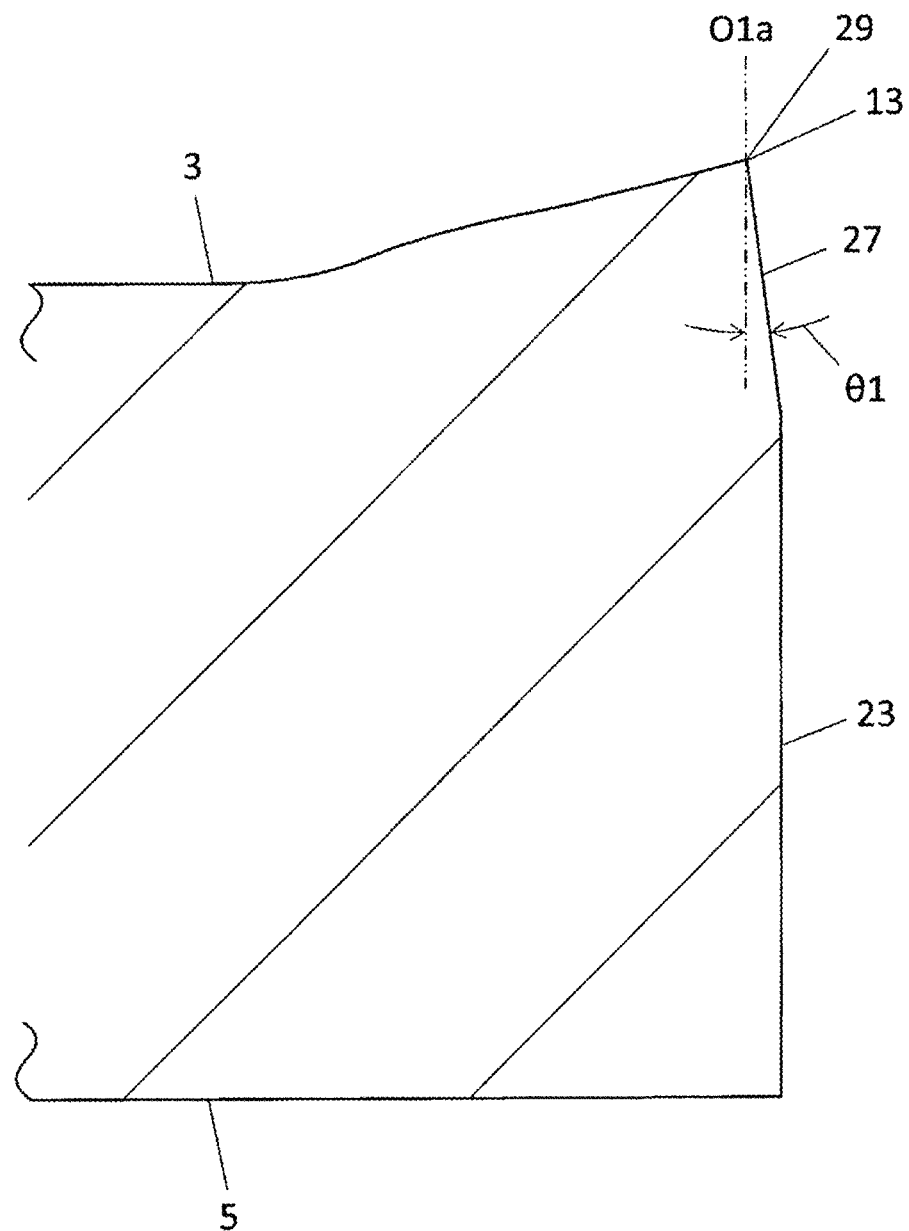
FIG. 6 is a sectional view taken along line VI-VI illustrated in FIG. 2.
Figure 7:
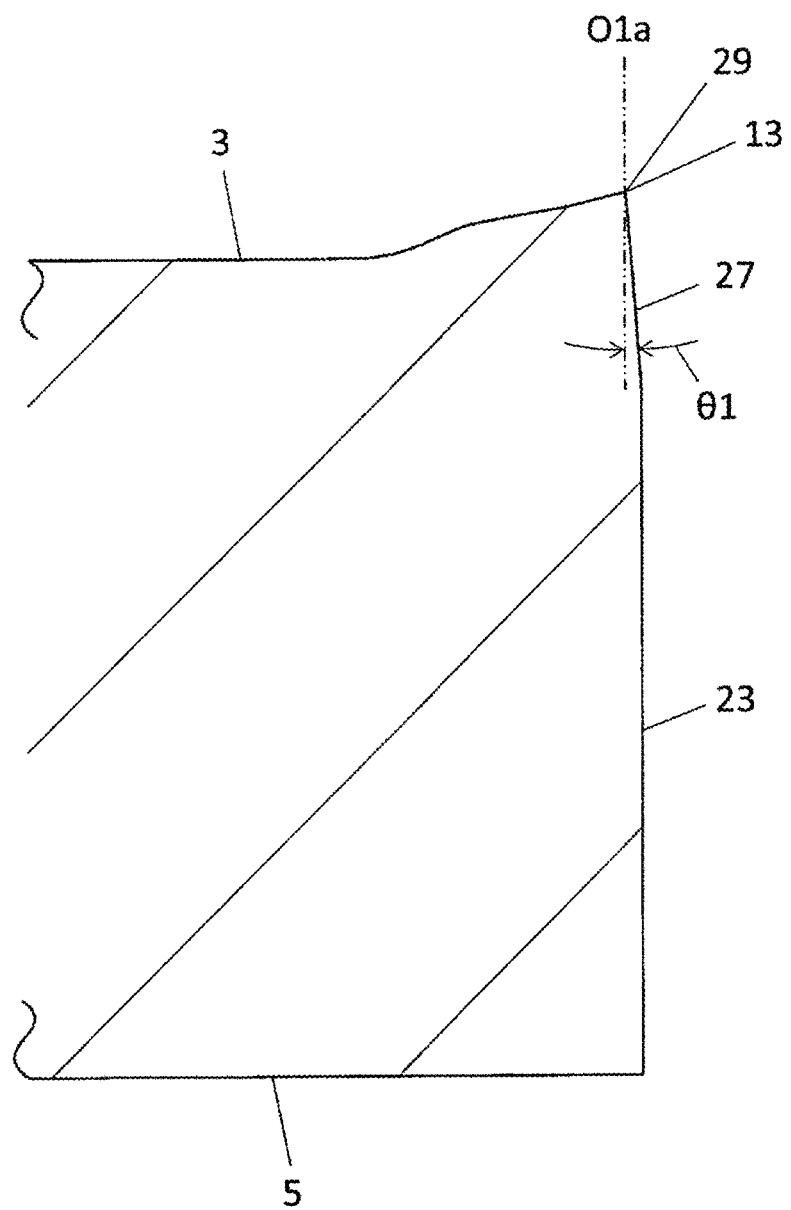
FIG. 7 is a sectional view taken along line VII-VII illustrated in FIG. 2.
Figure 8:
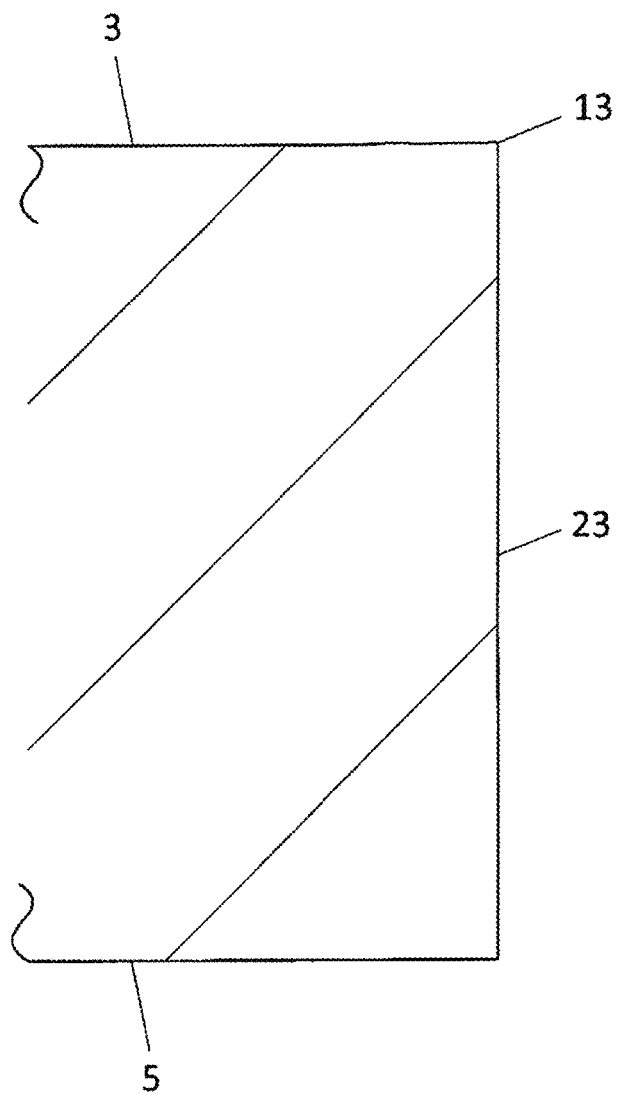
FIG. 8 is a sectional view taken along line VIII-VIII illustrated in FIG. 2.
Figure 9:
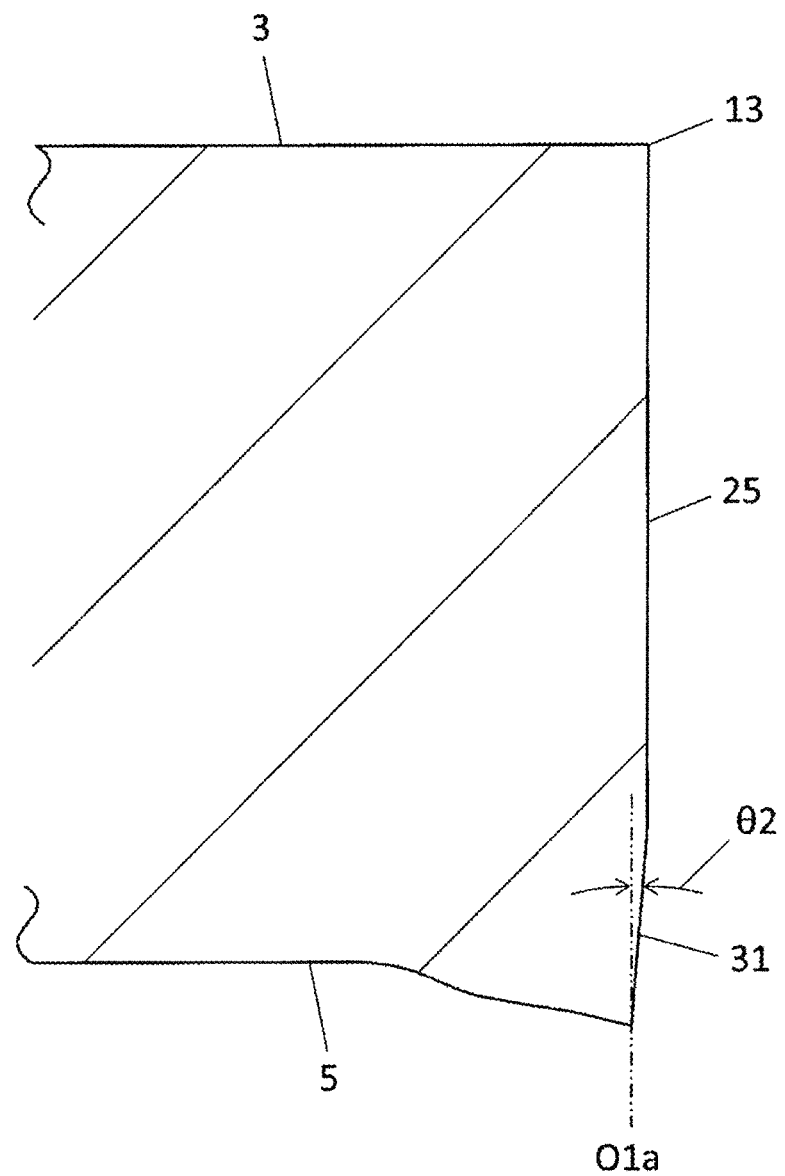
FIG. 9 is a sectional view taken along line IX-IX illustrated in FIG. 2.

The first inclined surface 27 may be located away from the first plane 21 as in the non-limiting embodiment illustrated in FIG. 4.

In cases where the first lateral surface 19 has the outwardly protruded shape as a whole, and the first plane 21, the second plane 23 and the third plane 25 are individually parallel to the central axis O1 as described above, it is easy to ensure a thickness between the through hole 9 and the first lateral surface 19 even though the insert 1 is downsized. If the first inclined surface 27 is located between the second plane 23 and the upper surface 3, the first inclined surface 27 tends to be located close to the cutting edge 11. In cases where the first inclined surface 27 comes closer to the central axis O1 as coming closer to the long side 13, a ridgeline 29 where the first inclined surface 27 intersects with the upper surface 3 has a large thickness, and the ridgeline 29 has high strength. Hence, even if the ridgeline 29 conflicts a workpiece during manufacture of a machined product, the ridgeline 29 is less prone to fracture. In cases where the first inclined surface 27 is located away from the first plane 21 located next to the through hole 9, it is easy to ensure the thickness between the through hole 9 and the first lateral surface 19 even though the first inclined surface 27 is disposed on the first lateral surface 19. The insert 1 therefore has enhanced durability.

The second plane 23 may connect to the first plane 21 or, alternatively, may be located away from the first plane 21. The third plane 25 may connect to the first plane 21 or, alternatively, may be located away from the first plane 21. The first inclined surface 27 may connect to the second plane 23 or, alternatively, may be located away from the second plane 23. The first inclined surface 27 may connect to the upper surface 3 or, alternatively, may be located away from the upper surface 3. For example, the second plane 23 and the third plane 25 may individually connect to the first plane 21 as in the non-limiting embodiment illustrated in FIG. 4. The first inclined surface 27 may connect to each of the second plane 23 and the upper surface 3.

An inclination angle $\theta_1$ of the first inclined surface 27 relative to the central axis O1 may be constant or changed. In cases where the first inclined surface 27 has a portion where the inclination angle $\theta_1$ becomes smaller as coming closer to the first plane 21 as in a non-limiting embodiment illustrated in FIGS. 6 and 7, a part of the first inclined surface 27 which is located close to the through hole 9 tends to have a relatively small inclination angle $\theta_1$. This makes it easier to ensure the thickness between the through hole 9 and the first lateral surface 19. In the above embodiment, a part of the first inclined surface 27 which is located close to the cutting edge 11 tends to have a relatively large inclination angle $\theta_1$. Consequently, a part of the ridgeline 29 which is located close to the cutting edge 11 has enhanced strength. This leads to high durability of the insert 1.

The inclination angle $\theta_1$ may become smaller as an entirety of the first inclined surface 27 comes closer to the first plane 21. The inclination angle $\theta_1$ is not limited to a specific value. For example, the inclination angle $\theta_1$ may be set to 1-20°. The inclination angle $\theta_1$ may be evaluated on the basis of an imaginary straight line O1a. This is also true for an inclination angle $\theta_2$ described later.

A width W1 of the first inclined surface 27 along the central axis O1 may be constant or changed. In cases where the first inclined surface 27 has a part which of the width W1 becomes smaller as coming closer to the first plane 21 as in the non-limiting embodiment illustrated in FIG. 4, a part of the width W1 in the first inclined surface 27, which is located close to the through hole 9, tends to be relatively small. It is therefore easy to ensure the thickness between the through hole 9 and the first lateral surface 19. In the above embodiment, a part of the width W1 in the first inclined surface 27, which is located close to the cutting edge 11, tends to be relatively large. Consequently, a part of the ridgeline 29 which is located close to the cutting edge 11 has enhanced strength. This leads to high durability of the insert 1.

The width W1 may become smaller throughout the first inclined surface 27 as coming closer to the first plane 21. The width W1 is not limited to a specific value. For example, the width W1 may be set to 0.3-1 mm. An area of the first inclined surface 27 may be smaller than an area of the second plane 23.

The first inclined surface 27 may be located closer to the short side 15 than the through hole 9 in a transparent plan view of the first lateral surface 19. In this embodiment, the first inclined surface 27 tends to be located close to the cutting edge 11. Consequently, the insert 1 has high durability. The configuration described above may be evaluated in a top view.

The ridgeline 29 may have a part that comes closer to the lower surface 5 as coming closer to the first plane 21 in a front view of the first lateral surface 19. An entirety of the ridgeline 29 may be extended so as to come closer to the lower surface 5 as coming closer to the first plane 21 in a front view of the first lateral surface 19.

The first lateral surface 19 may further have a second inclined surface 31. The second inclined surface 31 may be located between the third plane 25 and the lower surface 5. The second inclined surface 31 may be located more away from the central axis O1 as coming closer to the long side 13 as in a non-limiting embodiment illustrated in FIG. 9. The second inclined surface 31 may be located away from the first plane 21 as in the non-limiting embodiment illustrated in FIG. 4.

The insert 1 has enhanced durability, for example, in cases where the lower surface 5 has a short side as in the upper surface 3, and the insert 1 has a cutting edge (hereinafter referred to as "a lower cutting edge" for the sake of convenience) located on the short side of the lower surface 5. In cases where instead of the cutting edge 11, the lower cutting edge is used in a cutting process, a ridgeline where the second inclined surface 31 intersects with the lower surface 5 has high strength, and it is easy to ensure the thickness between the through hole 9 and the first lateral surface 19. This leads to the enhanced durability of the insert 1 even in the case of using the lower cutting edge in a cutting process.

The second inclined surface 31 may have a part whose inclination angle $\theta_2$ relative to the central axis O1 becomes smaller as coming closer to the first plane 21. The second inclined surface 31 may also have a part whose width W2 in a direction along the central axis O1 becomes smaller as coming closer to the first plane 21. An area of the second inclined surface 31 may be smaller than an area of the third plane 25.

The second plane 23 may connect to the lower surface 5 or, alternatively, may be located away from the lower surface 5. In cases where the second plane 23 connects to the lower surface 5 as in the non-limiting embodiment illustrated in FIG. 4, it is easy to ensure a large area of the second plane 23. It is therefore easy to ensure the thickness between the through hole 9 and the first lateral surface 19, thus leading to high durability of the insert 1. Additionally, the insert 1 tends to be stably fixed to the holder, thus leading to high constraint stability of the insert 1.

The third plane 25 may connect to the upper surface 3 or, alternatively, may be located away from the upper surface 3. In cases where the third plane 25 connects to the upper surface 3 as in the non-limiting embodiment illustrated in FIG. 4, it is easy to ensure a large area of the third plane 25. It is therefore easy to ensure the thickness between the through hole 9 and the first lateral surface 19, thus leading to high durability of the insert 1. Additionally, the insert 1 tends to be stably fixed to the holder, thus leading to high constraint stability of the insert 1.

A first boundary 33 between the first plane 21 and the second plane 23 may be inclined or parallel to the central axis O1 in a front view of the first lateral surface 19. In cases where the first boundary 33 is parallel to the central axis O1 as in the non-limiting embodiment illustrated in FIG. 4, a thickness of the insert 1 between the first plane 21 and the second plane 23 and the through hole 9 is less subject to variation. The insert 1 therefore has high durability.

In a front view of the first lateral surface 19, a second boundary 35 between the first plane 21 and the third plane 25 may be inclined or parallel to the central axis O1. In cases where the second boundary 35 is parallel to the central axis O1 as in the non-limiting embodiment illustrated in FIG. 4, a thickness of the insert 1 between the first plane 21 and the third plane 25 and the through hole 9 is less subject to variation. The insert 1 therefore has high durability.

An area of the first plane 21 may be smaller than each of the area of the second plane 23 and the area of the third plane 25. The area of the second plane 23 may be equal to or different from the area of the third plane 25.

The first plane 21 may be located more outward than the second plane 23 and the third plane 25 in a top view. The first plane 21 may be located most outward on the first lateral surface 19 in a top view.

A length L11 in a direction along the long side 13 on the first plane 21 may be smaller than each of a length L12 in a direction along the long side 13 on the second plane 23, and a length L13 in a direction along the long side 13 on the third plane 25. The length L11 may be evaluated by a maximum value of the length L11. This is also true for the length L12 and the length L13.

For example, cemented carbide and cermet are usable as a material of the insert 1. Examples of composition of the cemented carbide may include WC-Co, WC-TiC-Co and WC-TiC-TaC-Co, in which WC, TiC and TaC may be hard particles and Co may be a binding phase.

The cermet may be a sintered composite material obtainable by compositing metal into a ceramic component. Examples of the cermet may include titanium compounds composed mainly of titanium carbide (TiC) or titanium nitride (TiN). Of course, it should be clear that the material of the insert 1 is not limited to the above compositions.

A surface of the insert 1 may be coated with a coating film by using chemical vapor deposition (CVD) method or physical vapor deposition (PVD) method.

Examples of composition of the coating film may include titanium carbide (TiC), titanium nitride (TiN), titanium carbon nitride (TiCN) and alumina ($Al_2O_3$).

<Cutting Tools>

Figure 10:
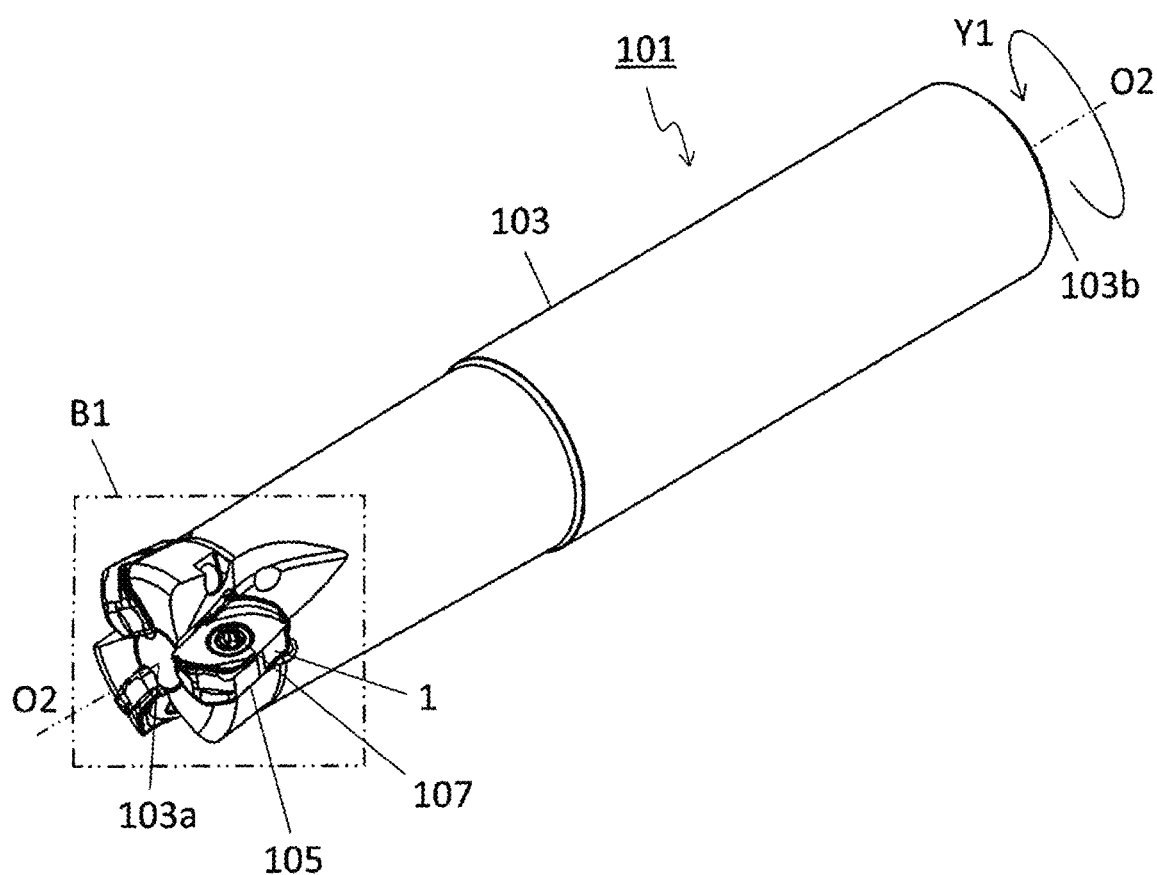
FIG. 10 is a perspective view illustrating a cutting tool in a non-limiting embodiment of the present disclosure.
Figure 11:
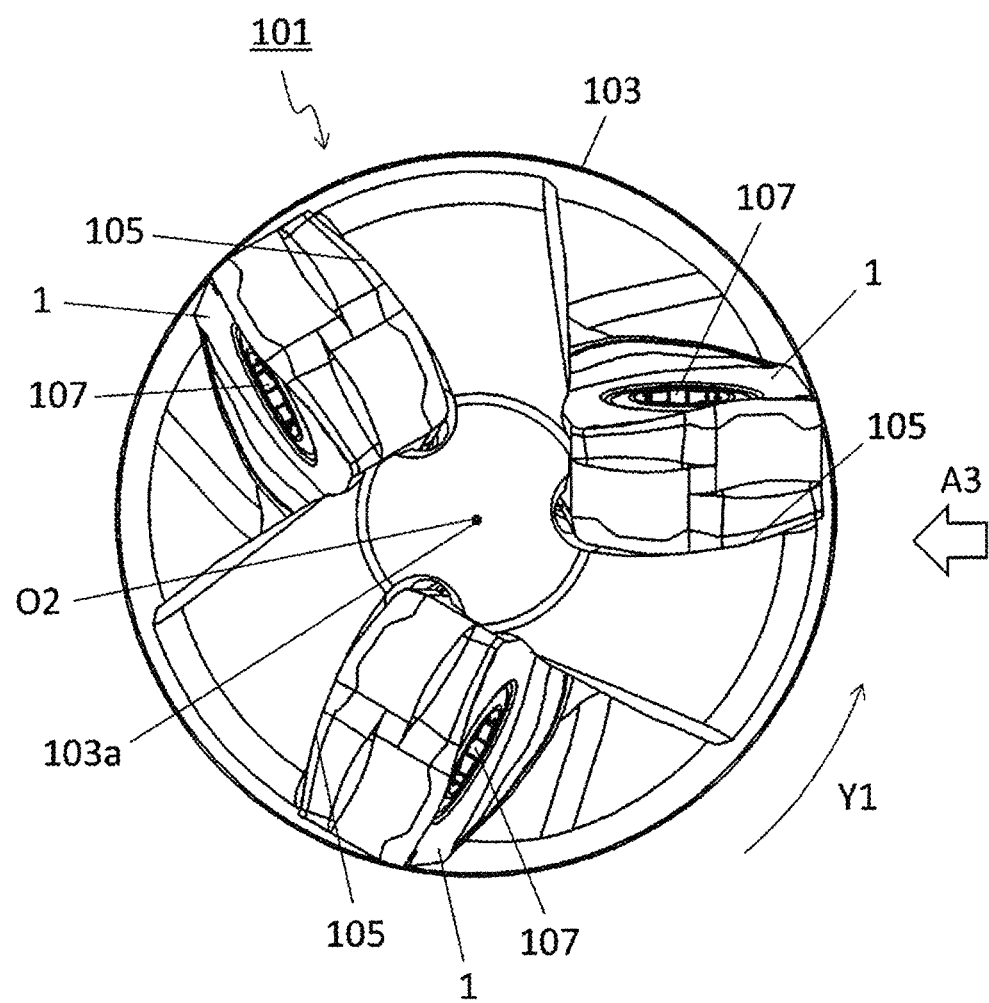
FIG. 11 is a plan view of the cutting tool illustrated in FIG. 10 as viewed from a side of a first end.
Figure 12:
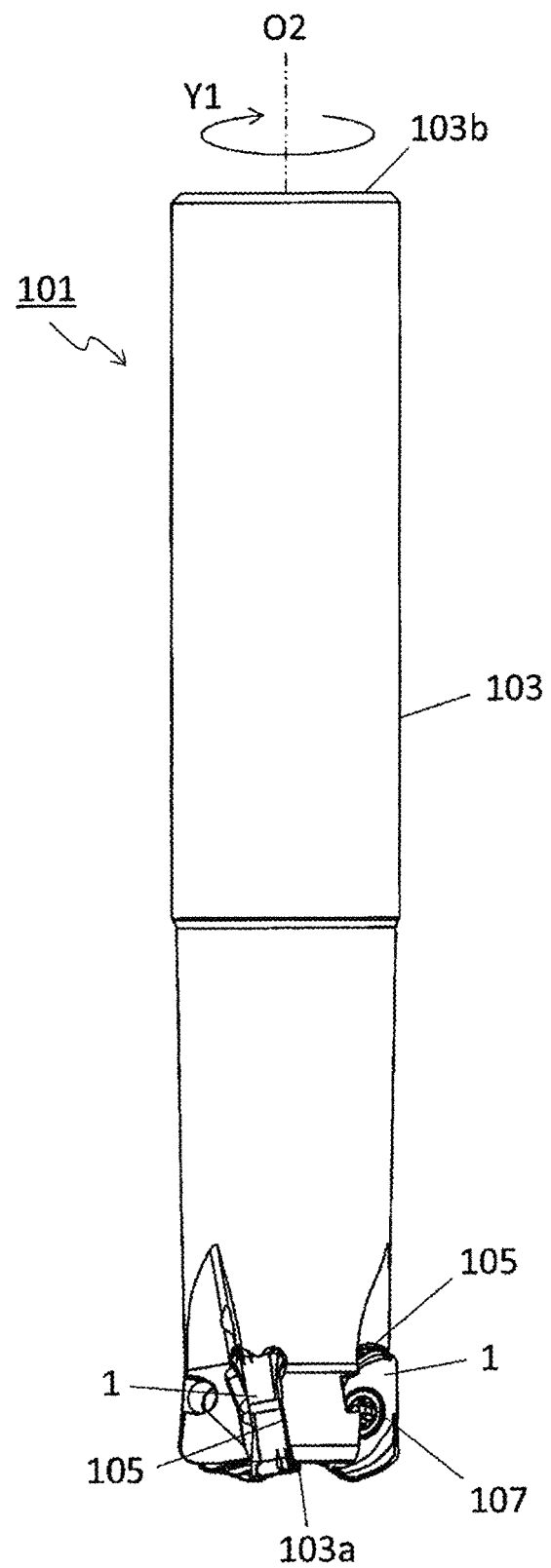
FIG. 12 is a side view of the cutting tool illustrated in FIG. 11 as viewed from an A3 direction.
Figure 13:
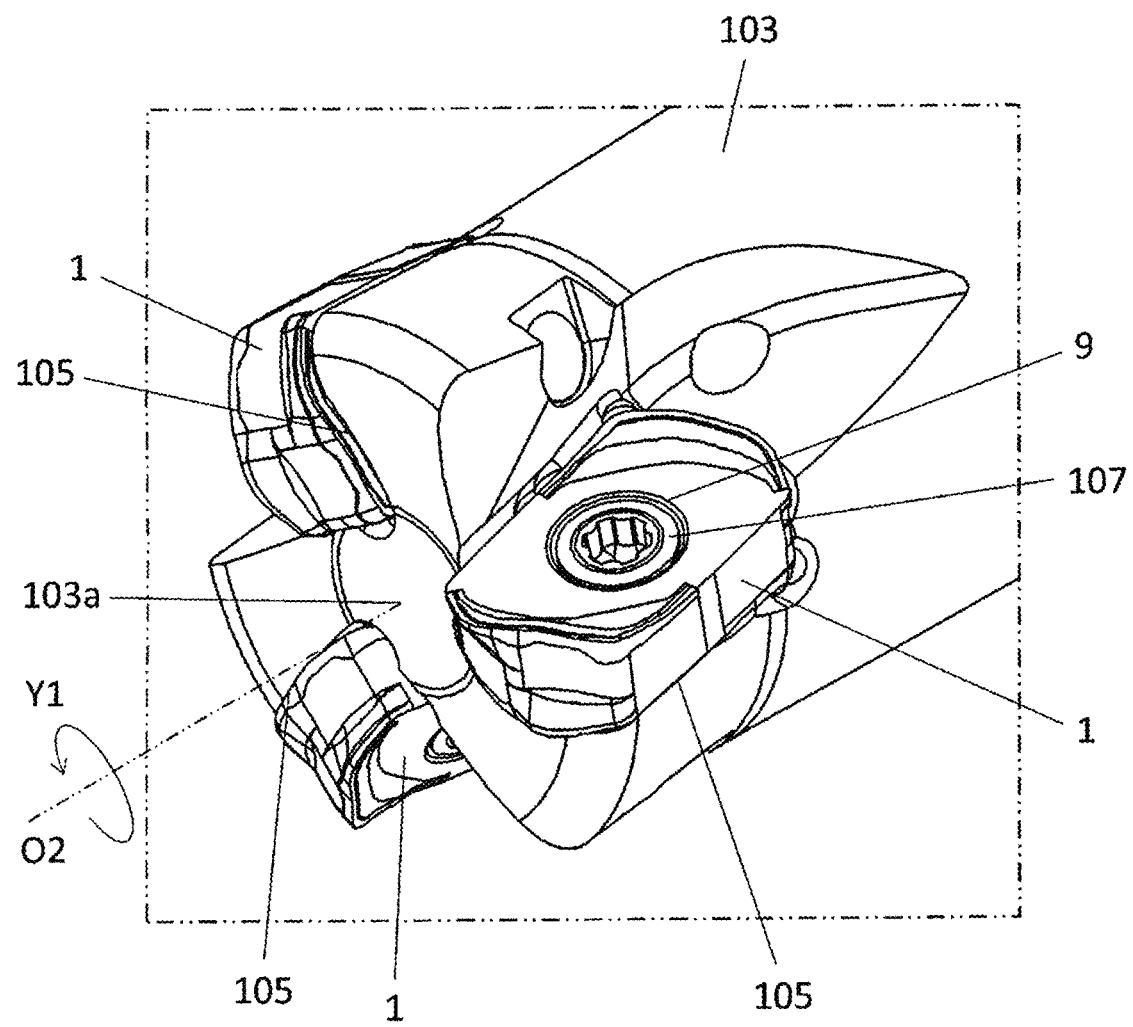
FIG. 13 is an enlarged view of a region B1 illustrated in FIG. 10.

A cutting tool 101 in a non-limiting embodiment of the present disclosure is described below with reference to FIGS. 10 to 13. In FIG. 10 and the like, a rotation axis O2 of the cutting tool 101 is indicated by a two-dot chain line, and a rotation direction of the rotation axis O2 is indicated by an arrow Y1.

The cutting tool 101 may have a holder 103 and an insert 1 as in the non-limiting embodiment illustrated in FIGS. 10 to 13. If the cutting tool 101 has the insert 1, excellent cutting performance is attainable because of the high durability of the insert 1.

The cutting tool 101 may be rotatable around the rotation axis O2. The cutting tool 101 may be used for a milling process.

The holder 103 may have a columnar shape extended along the rotation axis O2 from a first end 103a to a second end 103b. The columnar shape may be an approximately columnar shape, but need not be a strict columnar shape.

The holder 103 may have a pocket 105 located on a side of the first end 103a. The pocket 105 is a part that permits attachment of the insert 1. The pocket 105 may open into an outer peripheral surface of the holder 103 and an end surface on a side of the first end 103a.

The insert 1 may be located in the pocket 105. There may be one or a plurality of pockets 105. If the holder 103 has the plurality of pockets 105 as in the non-limiting embodiment illustrated in FIG. 11, the cutting tool 101 may have a plurality of inserts 1, and the inserts 1 may be located one by one in the pockets 105.

In cases where the holder 103 has the plurality of pockets 105, these pockets 105 may be located around the rotation axis O2 at equal intervals or unequal intervals.

The insert 1 may be fitted to the pocket 105 so that at least a part of the cutting edge 11 is protruded from the holder 103. For example, the insert 1 may be attached to the holder 103 so that the cutting edge 11 is protruded from the holder 103 toward a workpiece. In this embodiment, the lower surface 5 and the lateral surface 7 may be in contact with the holder 103.

The insert 1 may be attached to the pocket 105 with a screw 107. Specifically, the insert 1 may be attached to the holder 103 by inserting the screw 107 into the through hole 9 of the insert 1, and by inserting a front end of the screw 107 into a screw hole formed in the pocket 105 so as to fix the screw 107 to the screw hole.

For example, steel and cast iron are usable as a material of the holder 103. If the material of the holder 103 is steel, the holder 103 has high toughness.

<Methods for Manufacturing Machined Product>

Methods for manufacturing a machined product 203 in non-limiting embodiments of the present disclosure are described below with reference to FIGS. 14 to 16.

The machined product 203 may be manufactured by carrying out a cutting process of a workpiece 201. The methods for manufacturing the machined product 203 in the non-limiting embodiments may have the following steps:

(1) rotating the cutting tool 101 represented by the above non-limiting embodiment;

(2) bringing the cutting tool 101 being rotated into contact with the workpiece 201; and (3) moving the cutting tool 101 away from the workpiece 201.

Figure 14:
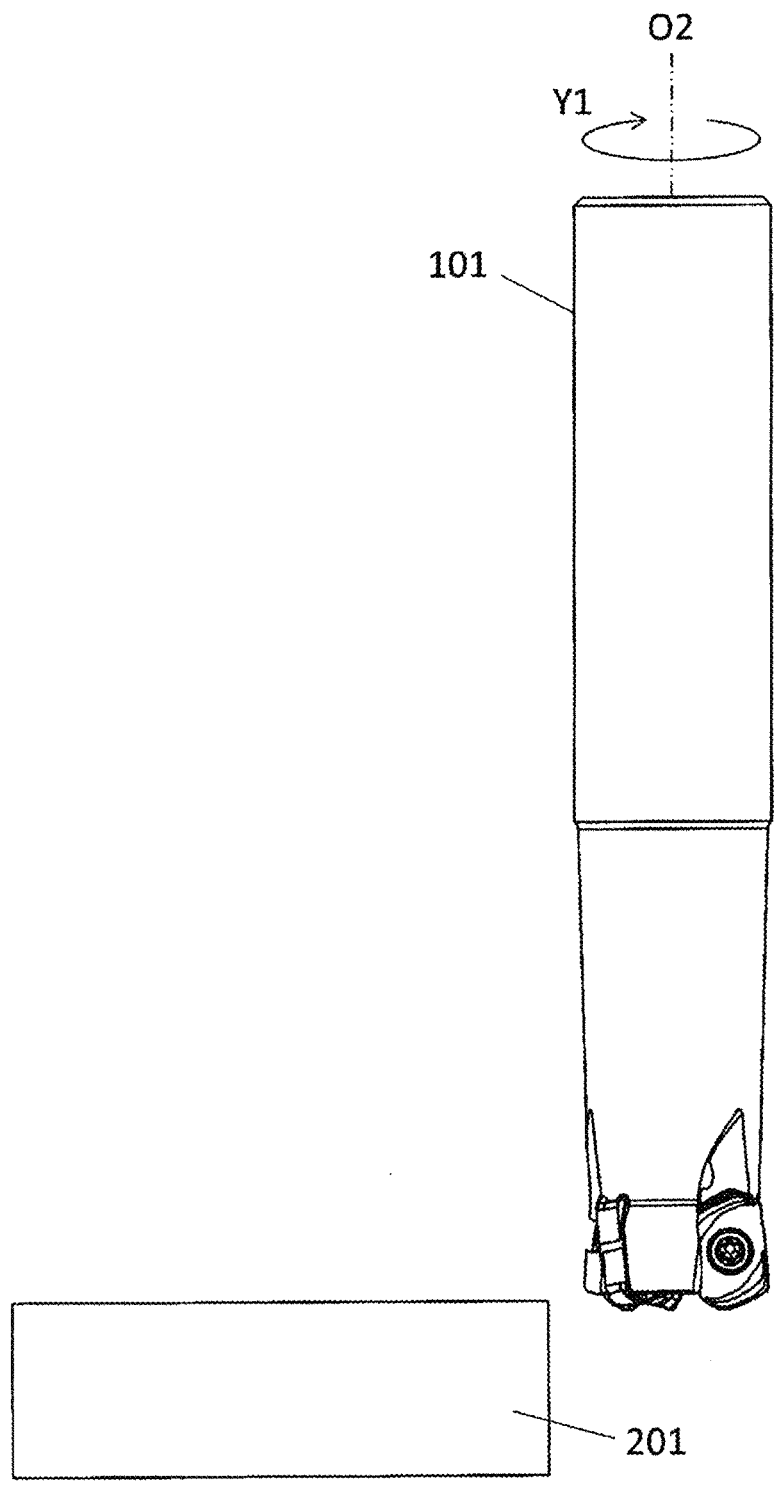
FIG. 14 is a schematic diagram illustrating one of steps in a method for manufacturing a machined product in a non-limiting embodiment of the present disclosure.

Specifically, firstly, the cutting tool 101 may be relatively brought near the workpiece 201 while rotating the cutting tool 101 around the rotation axis O2 in a Y1 direction as in the non-limiting embodiment illustrated in FIG. 14. Subsequently, the workpiece 201 may be cut out by bringing the cutting edge 11 of the cutting tool 101 into contact with the workpiece 201 as in the non-limiting embodiment illustrated in FIG. 15. Thereafter, the cutting tool 101 may be relatively moved away from the workpiece 201 as in a non-limiting embodiment illustrated in FIG. 16.

It becomes possible to offer excellent machinability by carrying out the above processes. Specifically, if the cutting tool 101 having the insert 1 is used in the method for manufacturing the machined product 203 in the non-limiting embodiment of the present disclosure, the insert 1 has high durability. It is therefore possible to obtain the machined product 203 having a highly precise finished surface.

Figure 15:
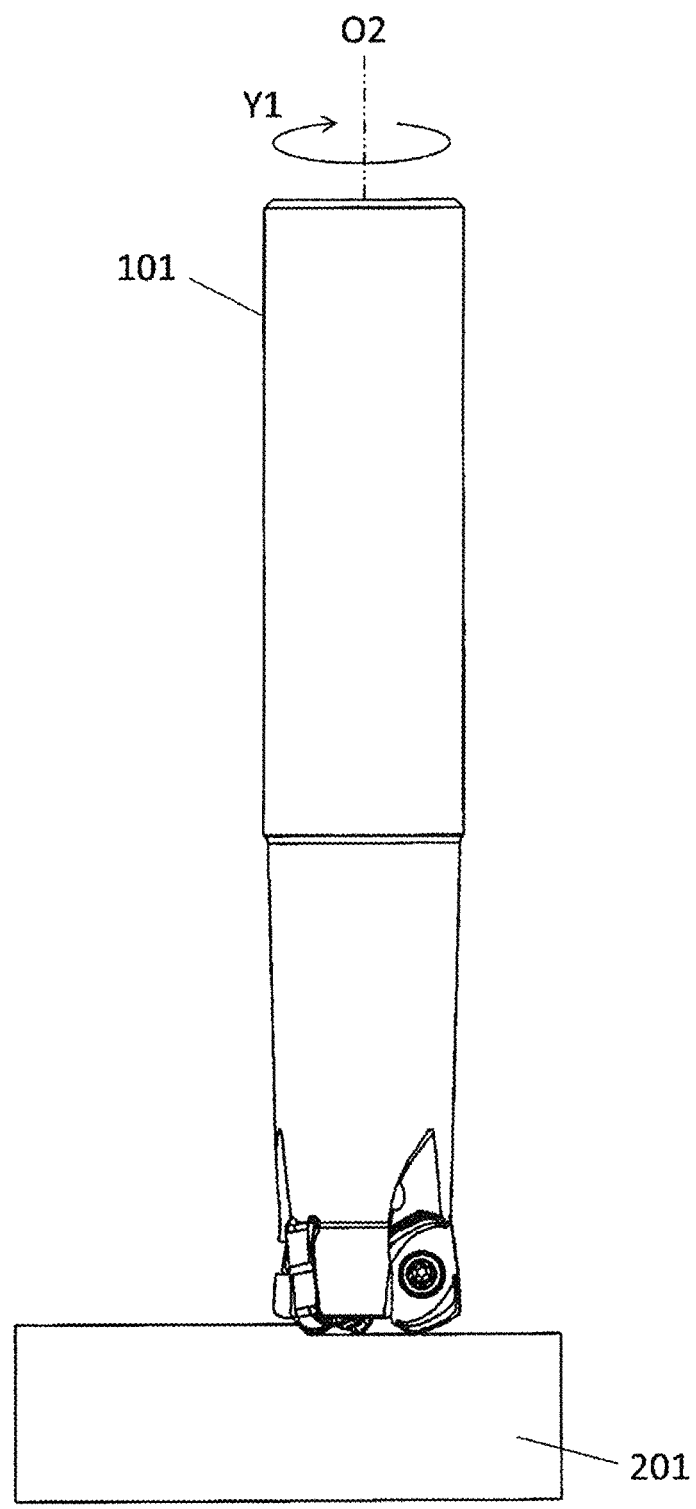
FIG. 15 is a schematic diagram illustrating one of the steps in the method for manufacturing a machined product in the non-limiting embodiment of the present disclosure.
Figure 16:
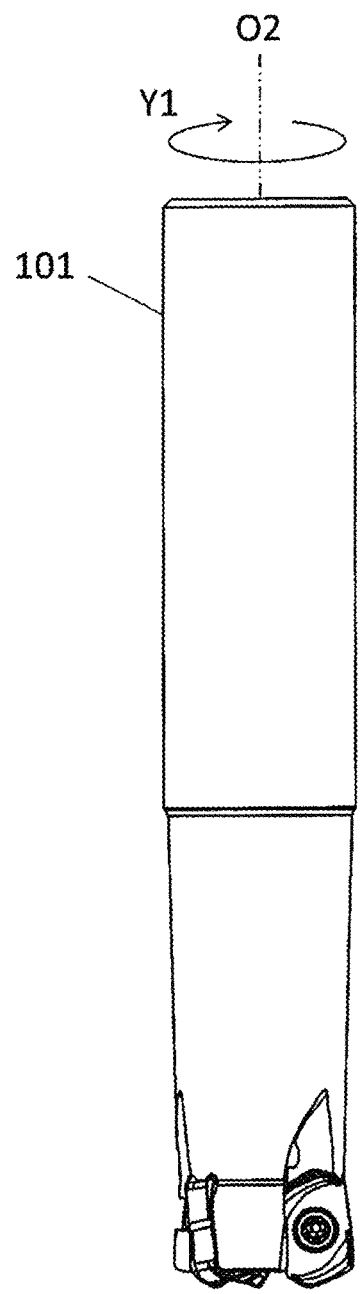
FIG. 16 is a schematic diagram illustrating one of the steps in the method for manufacturing a machined product in the non-limiting embodiment of the present disclosure.
Figure 16:
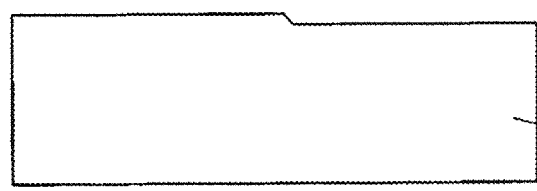

Although the workpiece 201 is fixed and the cutting tool 101 is moved in the individual processes in the non-limiting embodiment illustrated in FIGS. 14 to 16, it is not intended to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing the cutting edge 11 of the insert 1 into contact with different portions of the workpiece 201 may be repeated while keeping the cutting tool 101 rotated.

Examples of material of the workpiece 201 may include carbon steel, alloy steel, stainless steel, cast iron and non-ferrous metals.

The invention claimed is:

1. A cutting insert, comprising:
    an upper surface having a polygonal shape comprising a long side and a short side;
    a lower surface located on a side opposite to the upper surface;
    a lateral surface located between the upper surface and the lower surface;
    a through hole that opens into a center of the upper surface and a center of the lower surface; and
    a cutting edge located on the short side, wherein
    the lateral surface comprises a first lateral surface that is located along the long side and has an outwardly protruded shape in a top view,
    the first lateral surface comprises
        a first surface that is overlapped with a central axis of the through hole in a side view of the first lateral surface and is parallel to the central axis,
        a second surface that is located closer to the short side than the first surface and is parallel to the central axis,
        a third surface that is located more away from the short side than the first surface and is parallel to the central axis, and
        a first inclined surface that is located between the second surface and the upper surface, and is inclined toward the central axis as the first inclined surface extending toward the long side,
    the first inclined surface is spaced from the first surface, and
    the first inclined surface comprises a region having an inclination angle relative to the central axis, the inclination angle becoming smaller as the first inclined surface extending toward the first surface.

2. The cutting insert according to claim 1, wherein the first inclined surface comprises a further region having a width in a direction along the central axis, the width becoming smaller as the first inclined surface extending toward the first surface.

3. The cutting insert according to claim 1, wherein, in a transparent plan view of the first lateral surface,
    a length from the first inclined surface to the short side is a first length, and
    a length from the first inclined surface to the through hole is a second length, and
    the first length is smaller than the second length.

4. The cutting insert according to claim 1, wherein the first lateral surface further comprises a second inclined surface that is located between the third surface and the lower surface, and is inclined away from the central axis as the second inclined surface extending toward the long side, and
    the second inclined surface is spaced from the first surface.

5. The cutting insert according to claim 1, wherein the second surface connects to the lower surface.

6. The cutting insert according to claim 1, wherein the third surface connects to the upper surface.

7. The cutting insert according to claim 1, wherein a first boundary between the first surface and the second surface is parallel to the central axis in a front view of the first lateral surface.

8. A cutting tool, comprising:
    a holder having a columnar shape extended along a rotation axis from a first end to a second end and comprises a pocket located on a side of the first end; and
    the cutting insert according to claim 1, the cutting insert being located in the pocket.

9. A method for manufacturing a machined product, comprising:
    rotating the cutting tool according to claim 8;
    bringing the cutting tool being rotated into contact with a workpiece; and
    moving the cutting tool away from the workpiece.

10. A cutting insert, comprising:
    an upper surface having a polygonal shape comprising a long side and a short side;
    a lower surface located on a side opposite to the upper surface;
    a lateral surface located between the upper surface and the lower surface;
    a through hole that opens into a center of the upper surface and a center of the lower surface; and
    a cutting edge located on the short side, wherein
    the lateral surface comprises a first lateral surface that is located along the long side and has an outwardly protruded shape in a top view,
    the first lateral surface comprises
        a first surface that is overlapped with a central axis of the through hole in a side view of the first lateral surface and is parallel to the central axis,
        a second surface that is located closer to the short side than the first surface and is parallel to the central axis,
        a third surface that is located more away from the short side than the first surface and is parallel to the central axis, and
        a first inclined surface that is located between the second surface and the upper surface, and is inclined toward the central axis as the first inclined surface extending toward the long side,
    the first inclined surface is spaced from the first surface, and
    the first inclined surface comprises a region having a width in a direction along the central axis, the width becoming smaller as the first inclined surface extending toward the first surface.

11. The cutting insert according to claim 10, wherein, in a transparent plan view of the first lateral surface,
    a length from the first inclined surface to the short side is a first length, and
    a length from the first inclined surface to the through hole is a second length, and
    the first length is smaller than the second length.

12. The cutting insert according to claim 10, wherein the first lateral surface further comprises a second inclined surface that is located between the third surface and the lower surface, and is inclined away from the central axis as the second inclined surface extending toward the long side, and
the second inclined surface is spaced from the first surface.

13. The cutting insert according to claim 10, wherein the second surface connects to the lower surface.

14. The cutting insert according to claim 10, wherein the third surface connects to the upper surface.

15. The cutting insert according to claim 10, wherein a first boundary between the first surface and the second surface is parallel to the central axis in a front view of the first lateral surface.

16. A cutting tool, comprising:
a holder having a columnar shape extended along a rotation axis from a first end to a second end and comprises a pocket located on a side of the first end; and
the cutting insert according to claim 10, the cutting insert being located in the pocket.

17. A method for manufacturing a machined product, comprising:
rotating the cutting tool according to claim 16;
bringing the cutting tool being rotated into contact with a workpiece; and
moving the cutting tool away from the workpiece.

18. A cutting insert, comprising:
an upper surface having a polygonal shape comprising a long side and a short side;
a lower surface located on a side opposite to the upper surface;
a lateral surface located between the upper surface and the lower surface;
a through hole that opens into a center of the upper surface and a center of the lower surface; and
a cutting edge located on the short side, wherein
the lateral surface comprises a first lateral surface that is located along the long side and has an outwardly protruded shape in a top view,
the first lateral surface comprises
a first surface that is overlapped with a central axis of the through hole in a side view of the first lateral surface and is parallel to the central axis,
a second surface that is located closer to the short side than the first surface and is parallel to the central axis,
a third surface that is located more away from the short side than the first surface and is parallel to the central axis, and
a first inclined surface that is located between the second surface and the upper surface, and is inclined toward the central axis as the first inclined surface extending toward the long side,
the first inclined surface is spaced from the first surface, and
the second surface connects to the lower surface.

19. The cutting insert according to claim 18, wherein a first boundary between the first surface and the second surface is parallel to the central axis in a front view of the first lateral surface.

20. A cutting tool, comprising:
a holder having a columnar shape extended along a rotation axis from a first end to a second end and comprises a pocket located on a side of the first end; and
the cutting insert according to claim 18, the cutting insert being located in the pocket.

\* \* \* \* \*